US009458285B2

(12) United States Patent
Kim et al.

(10) Patent No.: US 9,458,285 B2
(45) Date of Patent: Oct. 4, 2016

(54) METHOD FOR PREPARING POLYALKYLENECARBONATE (71) Applicant: LG CHEM, LTD., Seoul (KR)

(72) Inventors: Yoon-Jung Kim, Daejeon (KR); Seung Young Park, Daejeon (KR); Taek-Jun Jung, Daejeon (KR); Yun-ki Cho, Daejeon (KR)

(73) Assignee: LG Chem, Ltd., Seoul (KR)

( * ) Notice: Subject to any disclaimer, the term of this patent is extended or adjusted under 35 U.S.C. 154(b) by 0 days.

(21) Appl. No.: 14/436,010

(22) PCT Filed: May 27, 2014

(86) PCT No.: PCT/KR2014/004728
§ 371 (c)(1),
(2) Date: Apr. 15, 2015

(87) PCT Pub. No.: WO2014/193145
PCT Pub. Date: Dec. 4, 2014

(65) Prior Publication Data
US 2015/0274882 A1     Oct. 1, 2015

(30) Foreign Application Priority Data

May 27, 2013 (KR) .................. 10-2013-0059875
May 27, 2014 (KR) .................. 10-2014-0063540

(51) Int. Cl.
C08G 64/34     (2006.01)
C08G 59/68     (2006.01)
C08G 65/26     (2006.01)
B01J 31/12     (2006.01)
C08G 64/02     (2006.01)
C08L 69/00     (2006.01)
C08G 65/04     (2006.01)
C08G 65/10     (2006.01)

(52) U.S. Cl.
CPC .............. *C08G 59/685* (2013.01); *B01J 31/12* (2013.01); *C08G 64/02* (2013.01); *C08G 64/34* (2013.01);
(Continued)

(58) Field of Classification Search
CPC ....................................................... C08G 64/34
USPC ................................................. 528/414, 408
See application file for complete search history.

(56) References Cited

U.S. PATENT DOCUMENTS 4,789,727 A     12/1988 Sun
4,943,677 A      7/1990 Rokicki
(Continued)

FOREIGN PATENT DOCUMENTS

JP         2-47134 A      2/1990
JP      2003-531221 A    10/2003
(Continued)

OTHER PUBLICATIONS

Soga, K., et al., Alternating Copolymerization of CO2 and Propylene Oxide with the Catalysts Prepared from Zn(OH)2 and Various Dicarboxylic Acids. Polymer Journal, 1981, vol. 13, pp. 407-410.

*Primary Examiner* — Duc Truong
(74) *Attorney, Agent, or Firm* — Dentons US LLP (57) ABSTRACT This disclosure relates to a method for preparing polyalkylenecarbonate. More specifically, in the method for preparing polyalkylenecarbonate, by using a solution polymerization with a specific heterogeneous catalyst and a solvent in the polymerization process of an epoxide compound and carbon dioxide, the products of side-reaction are reduced, removal of metal residues and by-products from the products is facilitated, danger due to overheating of the reactants is minimized, and heat removal and process stability are improved, and thus, high molecular weight copolymer may be easily provided, and mass production and scale-up are easy.

10 Claims, 3 Drawing Sheets (52) U.S. Cl.
CPC ......... *C08G 65/2603* (2013.01); *C08G 65/266* (2013.01); *C08G 65/269* (2013.01); *C08L 69/00* (2013.01)

(56) References Cited

U.S. PATENT DOCUMENTS

| | | |
|---|---|---|
| 5,026,676 A | 6/1991 | Motika et al. |
| 2003/0134740 A1 | 7/2003 | Meng et al. |

FOREIGN PATENT DOCUMENTS

| | | |
|---|---|---|
| JP | 2007-302731 A | 11/2007 |
| JP | 2008523181 A | 7/2008 |
| JP | 2011215264 A | 10/2011 |
| KR | 1019980020821 A | 6/1998 |
| KR | 100263821 B1 | 5/2000 |
| KR | 1020090025219 A | 3/2009 |
| KR | 100965107 B1 | 6/2010 |
| KR | 1020130044223 A | 5/2013 |
| WO | 00/14141 A1 | 3/2000 |

METHOD FOR PREPARING POLYALKYLENECARBONATE

This application is a National Stage Application of International Application No. PCT/KR2014/004728, filed on May 27, 2014, and claims the benefit of Korean Patent Application No. 10-2013-0059875, filed on May 27, 2013, and Korean Patent Application No. 10-2014-0063540, filed on May 27, 2014, all of which are hereby incorporated by reference in their entirety for all purposes as if fully set forth herein.

TECHNICAL FIELD

The present invention relates to a method for preparing polyalkylenecarbonate that uses a non-crystalline heterogeneous catalyst in a solution phase and thus is safe and can be easily scaled-up.

BACKGROUND ART

Polyalkylene carbonate resin is polymer material useful for packaging material or coating material and the like. A method of preparing polyalkylene carbonate resin from an epoxy compound and carbon dioxide is eco-friendly in that noxious compound phosgene is not used and that carbon dioxide can be obtained in the air.

Thus, many researchers have been developed various forms of catalysts in order to prepare polyalkylene carbonate resin from an epoxy compound and carbon dioxide.

A document (Polymer Journal, 1981, vol 13, p 407) describes a method for preparing synthetic resin using carbon dioxide as raw material, wherein reaction products of zinc hydroxide and various organic carboxylic acid are used as catalyst.

However, when polymerization is progressed using the catalyst described in the document, there were problems in that polymerization activity is low, polymerization medium is not homogeneous, and thus, PDI is high, and a long polymerization time is required.

Although polyalkylene carbonate is generally prepared by bulk polymerization using an organic metal catalyst, the polymerization may be conducted in a batch type, semi-continuous type, or continuous-type, and the polymerization may be conducted in two or more stages with different reaction conditions.

Even if these various methods are applied, the concentration of polymer in the solution increases as the reaction progresses, the produced high molecular weight polymer increase the viscosity of the solution, and thus, a catalyst cannot be uniformly dispersed in the reactant. Thus, excessive epoxide monomers compared to a catalyst should be used, and recovered and separately treated.

In addition, after bulk polymerization, when a solvent is additionally introduced so as to reduce the viscosity of produced polymer, high molecular weight polymer is converted into a uniform polymer solution, and thus, it takes long time to reach a viscosity at which the polymer can be transferred from a polymerization reactor and removed, and when the polymer with high viscosity is agitated, the motor of an agitator may be overloaded at the initial stage thus affecting a continuous process.

In addition, since an epoxy compound used in the reaction has high reactivity, it is difficult to control reaction heat by the existing bulk polymerization, and thus, it is difficult to apply for a scale up process while controlling the reaction.

It is known that the polymerization initiation temperature of ethylene oxide is about 100° C., reaction heat of 2324 kJ/kg is generated during autopolymerization, and heat capacity of ethylene oxide is 0.749 cal/g-K.

Particularly, pure ethylene oxide is known to be very highly reactive, and thus, when the one component is used in a large quantity, process danger may be caused. Thus, when the reactant is locally heated or contacts with cations or anions, due to the reaction heat generated by autopolymerization, explosive heating may be initiated. In addition, when large quantities of epoxide monomers react at elevated temperature, due to autopolymerization, they may be converted into polyalkyleneglycol thus degrading the physical properties of the final product.

Propylene oxide is also known to have reaction heat of 1500 kJ/kg during autopolymerization, and heat capacity of 0.495 cal/g-K (25° C., liquid), and thus, if pure propylene oxide is introduced in an excessive amount, it is highly probable that the large quantities of propylene oxide may be autopolymerized on the surface of a reactor, and thus, PPG and the like may be produced to adversely influence on the physical properties of resin.

DISCLOSURE

Technical Problem

Thus, the present invention suggests a composition and a preparation method suitable for a solution polymerization so as to control reaction heat due to the polymerization of epoxide monomers, particularly heat generated during side-reactions through autopolymerization instead of copolymerization forming a carbonate bond using a large quantity of solvents, improve heat removal and process stability, and develop a preparation method that can be easily scaled-up In addition, the present invention, by using the above preparation method, facilitates a post-treatment processes, can easily remove residual monomers and side-products, and can reduce additional side-reactions due to the side-reactions of residual monomers.

Thus, it is an object of the invention to provide a method for preparing polyalkylenecarbonate that conducts polymerization in a solution phase using a specific heterogeneous catalyst when preparing polyalkylenecarbonate, thereby improving the rate of conversion of an epoxide compound, reducing the products of side-reactions that are promoted as the reaction progresses, and minimizing danger due to local overheating, thus improving process stability and heat removal property.

It is another object of the invention to provide a method for preparing polyalkylenecarbonate that can be easily applied for mass-production and scale-up.

Technical Solution

One aspect of the invention provides a method for preparing polyalkylenecarbonate comprising the step of solution polymerizing an epoxide compound and continuously or non-continuously introduced carbon dioxide in the presence of a ZnGA-based catalyst and a solvent, wherein the solvent is C1-5 alkylene substituted with at least one chlorine.

It is preferable that the epoxide compound:solvent is used at a weight ratio of 1:0.1 to 1:100, more preferably at a weight ratio of 1:1 to 1:10. One kind of the solvent may be used, or it may be used in a mixture of 2 or more kinds.

In addition, the solvent may be methylene chloride or ethylene dichloride.

The ZnGA-based catalyst may include a heterogeneous catalyst including zinc glutarate prepared by the reaction of zinc oxide and glutaric acid. In addition, the ZnGA-based catalyst may include a heterogeneous catalyst wherein acetic acid exists as a separate mixture from zinc glutarate (ZnGA-AA).

The ZnGA-based catalyst:epoxide compound may be introduced at a mole ratio of 1:50 to 1:1000.

The epoxide compound:carbon dioxide may be introduced at a mole ratio of 1:1 to 1:10.

The solution polymerization may be conducted at 60 to 90° C. and 20 to 40 bar, for 3 to 9 hours.

In addition, the epoxide compound may be selected from the group consisting of C2-20 alkylene oxide unsubstituted or substituted with halogen or a C1-5 alkyl group; C4-20 cycloalkylene oxide unsubstituted or substituted with halogen or a C1-5 alkyl group; and C8-20 styrene oxide unsubstituted or substituted with halogen or a C1-5 alkyl group. It is preferable that the epoxide compound includes C2-20 alkylene oxide unsubstituted or substituted with halogen or a C1-5 alkyl group.

Further, the polyalkylene carbonate may include polyethylenecarbonate with weight average molecular weight of 5000 to 500,000.

Advantageous Effects of Invention

According to the present invention, when preparing polyalkylenecarbonate using an epoxide compound and carbon dioxide, through a solution polymerization using a specific solvent and a catalyst, danger due to local overheating of the reactants may be reduced, and a polymer compound with controlled side-reactions and high selectivity may be prepared. In addition, the existing bulk polymerization is difficult to control reaction heat, and is difficult to scale-up to high conversion rate of the epoxide monomers due to rapid increase in the viscosity of the reactants, while the solution polymerization according to the present invention may relatively easily control reaction heat and side-reactions, easily control the viscosity of polymer, and thus, may be easily scaled-up.

DESCRIPTION OF EMBODIMENTS

Hereinafter, the present invention will be explained in detail. The terms or words used in the specification and the claims should not be limited to dictionary definitions, and should be interpreted as meanings and concepts corresponding to the technical idea of the invention, based on the principle that inventors can appropriately define the concepts of terms in order to explain one's own invention in the best way.

According to one embodiment of the invention, provided is a method for preparing polyalkylenecarbonate comprising the step of solution polymerizing an epoxide compound and continuously or non-continuously introduced carbon dioxide in the presence of a ZnGA-based catalyst and a solvent, wherein the solvent is C1-5 alkylene substituted with at least one chlorine.

In the case of a bulk polymerization that was previously used predominantly, as a reaction progresses, side-reactions occurred due to autopolymerization of monomers or back-biting of the produced polymer chain, thus affecting the physical properties of the obtained polymer, and it was cumbersome to remove catalyst residue and by-products in the treatment process after polymerization. In addition, in the existing bulk polymerization, it was difficult to uniformly mix polymerized product in the reactor and to uniformly control reaction heat within the reaction time, and thus, scale-up above lab scale was difficult.

Thus, the present invention provides a method that can reduce danger due to over-heating, by progressing a solution polymerization using a ZnGA-based heterogeneous catalyst and a specific solvent, when preparing polyalkylenecarbonate. According to the method, reaction heat may be relatively easily controlled, side reactions due to autopolymerization may be reduced, and the viscosity of polymer in the reactor may be easily controlled, and thus, mixing may be easily conducted during a scaled-up reaction.

In addition, the present invention may exhibit conversion rate of an epoxide compound equal to or greater than that of the existing method, and simultaneously, smoothly remove metal catalyst residues and by-products from the final polymer, and reduce side-reactions.

In the solution polymerization according to one embodiment, a specific solvent was drawn through screening of polymerization and literature search. The specific solvent may be C1-5 alkylene substituted with at least one chlorine. In addition, one kind of the solvent may be used, or it may be used in a mixture of 2 or more kinds. Specific examples of the solvent may include methylene chloride or ethylene dichloride. In case a solution polymerization is progressed using other solvents excluding the specific solvent used in the present invention, a polymerization reaction may not be properly achieved and thus polyalkylenecarbonate may not be prepared.

It is preferable that the epoxide compound:solvent is used at a weight ratio of 1:0.1 to 1:100, more preferably at a weight ratio of 1:1 to 1:10.

Wherein, it the ratio is less than 1:0.1, the solvent may not properly act as a reaction medium, and thus, it may be difficult to obtain the above explained advantages of a solution polymerization. In addition, if the ratio is greater than 1:100, monomer concentration may comparatively decrease, and thus, productivity may be lowered, and the molecular weight of the finally polymer may decrease or side-reactions may increase.

In addition, within the mole ratio of the catalyst and the epoxide compound of about 1:80 to 1:120 that is suitable for a solution polymerization, it is more preferable that the weight ratio of the epoxide compound and the solvent may be 1:1.5 to 1:10.

The ZnGA-based catalyst that is used in the present invention may basically include ZnGA only, or it may have a catalyst composition including monocarboxylic acid such as acetic acid and the like.

More specifically, according to one embodiment of the invention, the ZnGA-based catalyst may include zinc glutarate (ZnGA) prepared by the reaction of zinc oxide and glutaric acid. And, in the reaction, a boiling aromatic solvent, for example, boiling toluene or benzene may be used, and a polar solvent such as water, alcohol and the like may be used.

In addition, according to the one embodiment, it may be preferable that a heterogeneous catalyst wherein zinc glutarate and acetic acid exist in separate mixtures is used as the ZnGA-based catalyst, The heterogeneous catalyst may be represented by ZnGA-AA. Namely, the acetic acid may be separately added and used, and it may be used in the amount of 1 to 10 parts by weight, based on 100 parts by weight of the ZnGA-based catalyst. The acetic acid functions for controlling pH at the synthesis reaction of the ZnGA-AA catalyst, so that glutaric acid may be easily dissolved in toluene.

The ZnGA-based catalyst, which is a non-crystalline heterogeneous catalyst, exhibits excellent reactivity and selectivity at solution polymerization than bulk polymerization, and has excellent catalytic activity.

In addition, the ZnGA-based catalyst:epoxide compound may be introduced at a mole ratio of 1:50 to 1:1000. Preferably, the ZnGA-based catalyst:epoxide compound may be introduced at a mole ratio of 1:70 to 1:600, or 1:80 to 1:300. If the ratio is greater than 1:1000, it may be difficult to exhibit sufficient catalytic activity at solution polymerization, and if it is less than 1:50, it may not be efficient due to the use of an excessive amount of the catalyst, by-products may be generated, molecular weight may decrease due to back-biting of the polymer by heating in the presence of a catalyst, and the production amount of cyclic carbonate may increase.

According to one embodiment of the invention, the introduction amount of the ZnGA-based catalyst may be preferably 100:1 or more, based on the mole ratio of the epoxide compound:the catalyst, when the epoxide compound and the solvent are used at weight ratio of 1:1. If the catalyst is excessively introduced at a ratio below 100:1, it may have side effects of promoting production of by-products and back-biting of the produced polymer.

Meanwhile, the epoxide compound may be at least one selected from the group consisting of C2-20 alkylene oxide unsubstituted or substituted with halogen or a C1-5 alkyl group; C4-20 cycloalkylene oxide unsubstituted or substituted with halogen or a C1-5 alkyl group; and C8-20 styrene oxide unsubstituted or substituted with halogen or a C1-5 alkyl group. More preferably, the epoxide compound may include C2-20 alkylene oxide unsubstituted or substituted with a C1-5 alkyl group.

Specific examples of the epoxide compound may include ethylene oxide, propylene oxide, butene oxide, pentene oxide, hexane oxide, octane oxide, decene oxide, dodecene oxide, tetradecene oxide, hexadecane oxide, octadecene oxide, butadiene monoxide, 1,2-epoxy-7-octene, epifluorohydrin, epichlorohydrin, epibromohydrin, isopropyl glycidyl ether, butyl glycidyl ether, t-butyl glycidyl ether, 2-ethylhexyl glycidyl ether, allyl glycidyl ether, cyclopentene oxide, cyclohexene oxide, cyclooctene oxide, cyclododecen oxide, α-pinene oxide, 2,3-epoxynorbornen, limonene oxide, dieldrin, 2,3-epoxypropylbenzene, styrene oxide, phenylpropylene oxide, stibene oxide, chlorostilbene oxide, dichlorostilbene oxide, 1,2-epoxy-3-phenoxypropane, benzyloxymethyl oxirane, glycidyl-methylphenyl ether, chlorophenyl-2,3-epoxypropyl ether, epoxypropyl methoxyphenyl ether, biphenyl glycidyl ether, glycidyl naphthyl ether and the like. Preferably, ethylene oxide is used as the epoxide compound.

The carbon dioxide may be continuously or non-continuously introduced during the reaction, but it is preferable to continuously introduce, and in this case, as a polymerization reactor, a semi-batch type or a closed batch system may be preferably used. If carbon dioxide is not continuously introduced, by-products such as polyethyleneglycol and the like may increase, separately from the copolymerization of carbonate aimed in the present invention. And, when carbon dioxide is continuously introduced, reaction pressure may be 5 to 50 bar, or 10 to 40 bar.

In addition, the epoxide compound:carbon dioxide may be introduced at a mole ratio of 1:1 to 1:10. More preferably, the epoxide compound:carbon dioxide may be introduced at a mole ratio of 1:2 to 1:5. In case carbon dioxide is introduced at the above ratio, as a polymerization reactor, a semi-batch type system may be preferably used.

Meanwhile, the solution polymerization may be conducted at a temperature of 50 to 100° C. In addition, since autopolymerization temperature of the epoxide compound, particularly ethylene oxide is 90° C., it is more preferable that the solution polymerization is conducted at a temperature of 60 to 90° C. so as to reduce the contents of by-products due to autopolymerization Furthermore, in case high concentration of monomers are reacted at high temperature for a long time such as in a bulk polymerization, since alkylene carbonate may be formed by back-biting due to metal residues of the polymer, it is difficult to obtain high selectivity and yield even if a polymerization time is prolonged.

However, the present invention may exhibit a conversion rate of an epoxide compound similar to the existing method even with a shorter polymerization time, and decrease generation of by-products.

The solution polymerization according to the one embodiment may be conducted at 60 to 90° C. for 3 to 9 hours. In the solution polymerization, if the polymerization time is less than 3 hours, it may be too short, and thus, polymerization may not be properly achieved, and yield and productivity may not be sufficient. In addition, if the polymerization time is 9 hours or more, side-reactions such as back-biting may occur to increase by-products and decrease molecular weight. Furthermore, if the polymerization temperature is less than 60° C., polymerization rate per hour may become slow, and thus, yield of polymer may decrease. Particularly when ethylene oxide is used, if the polymerization temperature is 90° C. or more, PEG by-products may be generated due to autopolymerization of ethylene oxide, and it may be difficult to control the temperature of a reactor due to overheating during the reaction.

In addition, the polyalkylenecarbonate prepared according to one embodiment of the invention may include a copolymer of an epoxide compound and carbon dioxide; particularly, a copolymer of ethyleneoxide and carbon dioxide, polyethylenecarbonate having weight average molecular weight of 5000 to 500,000. And, according to the method of the present invention, a conversion rate of an epoxide compound may be at least 30% when polymerization is conducted for 3 hours, more preferably 40 to 90%.

Hereinafter, preferable examples of the invention will be explained in detail. However, these examples are only to illustrate the invention, and the scope of the invention is not limited thereto.

EXPERIMENTAL EXAMPLE 1

Experiment of Confirming Solvent According to Solution Polymerization 1

For process stability at scale up, a bulk polymerization was converted into a solution polymerization, and a solvent suitable for PEC polymerization using a ZnGA-AA catalyst was screened (designated as Experimental Examples 1a to 1f). Wherein, acetic acid was mixed in the amount of 1 part by weight per 100 parts by weight of ZnGA to prepare a ZnGA-AA catalyst.

Specifically, while moisture and oxygen were blocked, the ZnGA-AA catalyst and ethyleneoxide were introduced into a reactor. In addition, as a solvent, ethylene dichloride (EDC) was additionally introduced, and 20 or 25 bar of carbon dioxide gas was introduced into the reactor, and then, solution polymerization was conducted in a closed state. Wherein, the amount of the catalyst and each material used are as shown in the Table 1.

In addition, while maintaining reaction temperature at 80° C., reaction time was changed to 6 hours, 20 hours and 40 hours, and the results were compared.

When carbon dioxide was non-continuously introduced, it was observed that as the reaction progresses, the pressure of the reactor decreased due to the consumption of carbon dioxide, and after the pressure decreased about 5 bar, carbon dioxide gas was removed to complete the reaction. The obtained viscous liquid was dripped in a methanol solution to obtain a white solid. After agitation in methanol for about 12 hours, solid was obtained, and the sample was dried in a vacuum state.

Figure 1:
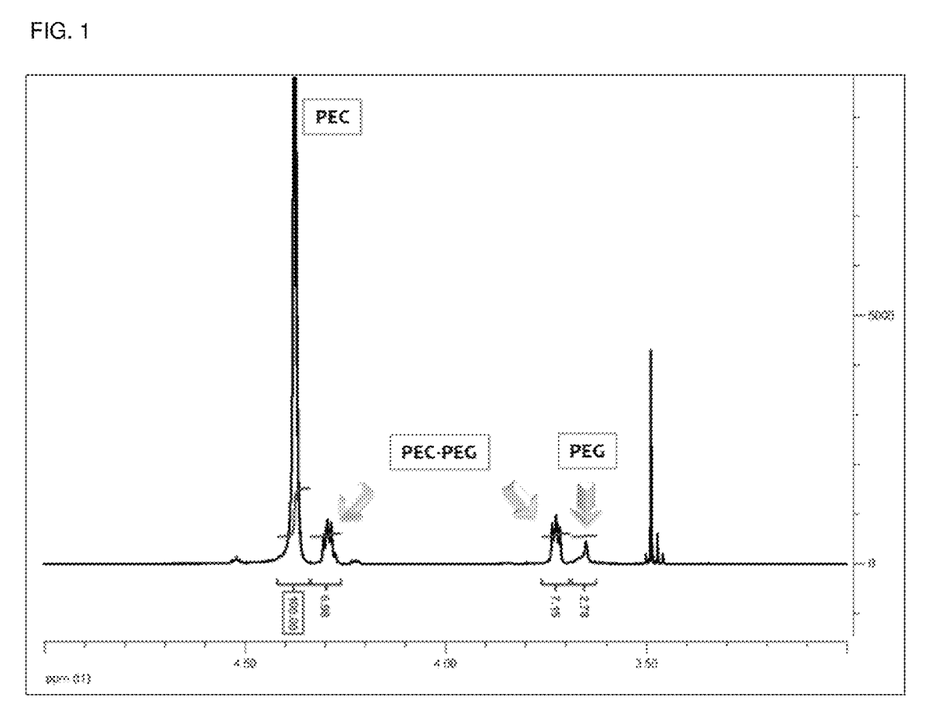
FIG. 1 shows the 1-H NMR spectrum result of PEC obtained by Experimental Example 1d.
Figure 2:
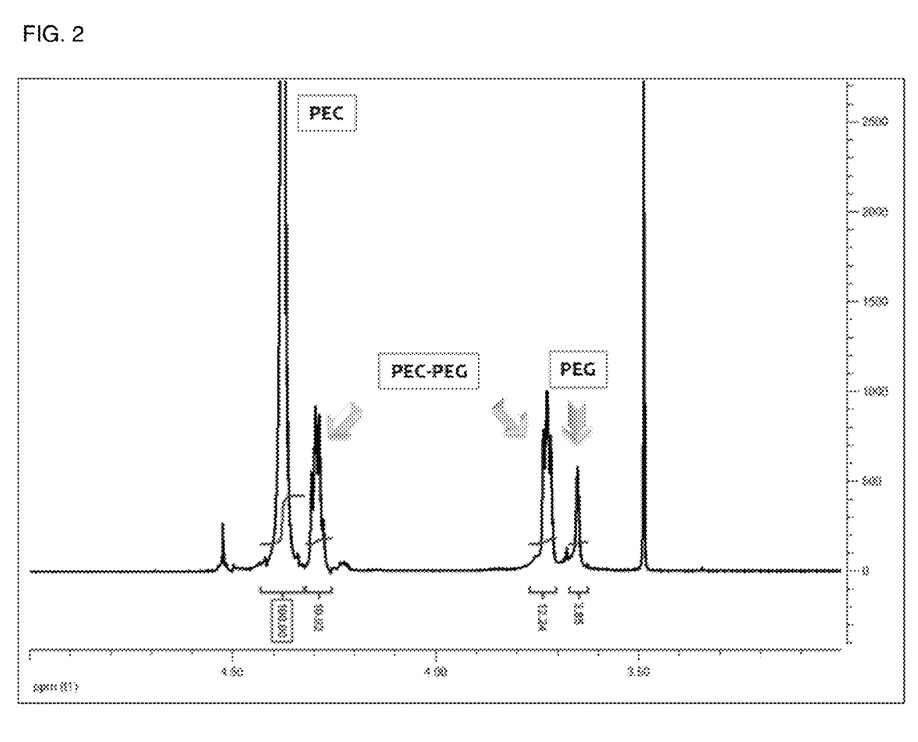
FIG. 2 shows the 1-H NMR spectrum result of PEC obtained by Experimental Example 1e.
Figure 3:
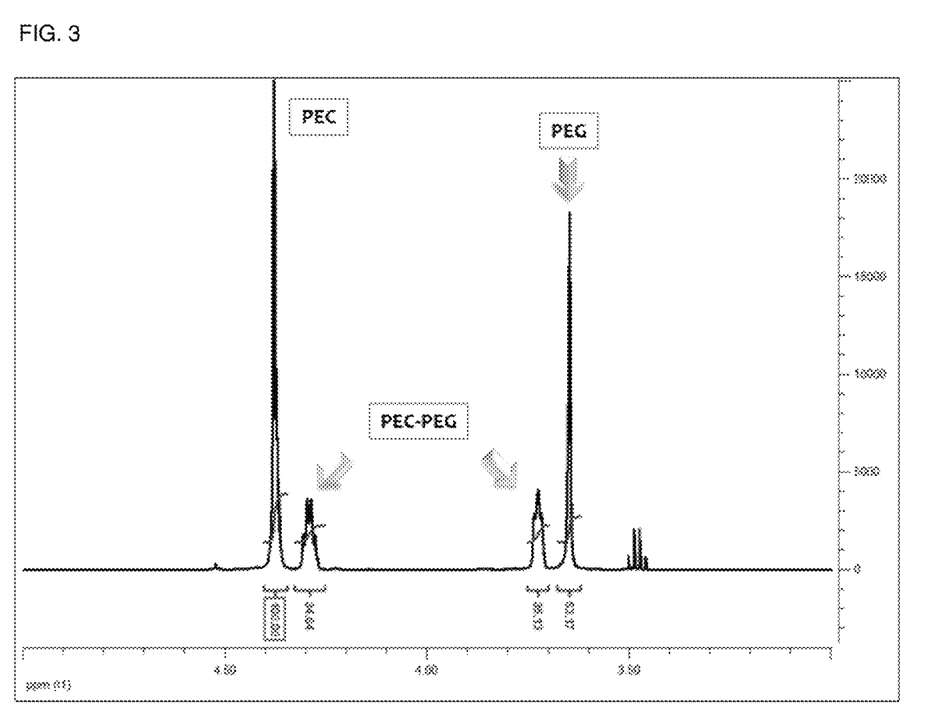
FIG. 3 shows the 1-H NMR spectrum result of PEC obtained by Experimental Example 1f.

Through these processes, polyethylenecarbonate (PEC) copolymer was prepared, and the polymerization results are shown in the Table 1.

of conversion into polyethylenecarbonate-ethyleneglycol copolymer and polyethyleneglycol also increase in proportion.

As the rate of conversion into polyethyleneglycol increases, selectivity of the obtained polymer decreases, and the physical properties of the polymer are degraded because of the unique properties of polyethyleneglycol. As polymerization time is longer, the rate of conversion into polyethyleneglycol that is formed by autopolymerization of ethyleneoxide increases, and it functions as a plasticizer to affect the physical properties of polyethylenecarbonate. Thus, it was judged that it is required to adjust optimum conversion rate point (optimum conversion point of PEG and PEG), and Experimental Example 2 was conducted.

EXPERIMENTAL EXAMPLE 2

Experiment of Confirming Solvent According to Solution Polymerization 2

A copolymer of ethyleneoxide and carbon dioxide was prepared under the conditions of Table 2 by the same procedure as Example 1, except using methylenechloride (MC) as a solvent. The results of solution polymerization using a ZnGA-AA catalyst and MC are shown in Tables 2 and 3. Wherein, carbon dioxide introduced into the reactor was continuously supplied.

TABLE 1

|  |  | 1a | 1b | 1c | 1d | 1e | 1f |
|---|---|---|---|---|---|---|---|
| Cat. amt | (g) | 0.10 | 0.10 | 0.10 | 0.10 | 0.10 | 0.10 |
| Cat. amt | (mmol) | 0.53 | 0.53 | 0.52 | 0.53 | 0.52 | 0.52 |
| EO | (mL) | 2.72 | 8.02 | 15.15 | 14.80 | 11.04 | 16.92 |
| EO | (g) | 2.40 | 7.07 | 13.36 | 13.05 | 9.74 | 14.92 |
| EO | (mol) | 0.05 | 0.16 | 0.30 | 0.30 | 0.22 | 0.34 |
| Solvent | (g) | 0.00 | 4.82 | 5.06 | 5.01 | 5.01 | 5.02 |
| EO/cat. |  | 103 | 305 | 587 | 557 | 428 | 653 |
| $CO_2$ | (bar) | 20 | 20 | 25 | 25 | 25 | 25 |
| Temperature | (° C.) | 80 | 80 | 80 | 80 | 80 | 80 |
| Time | (h) | 20 | 20 | 20 | 6 | 20 | 40 |
| Yield | (g) | 3.03 | 4.28 | 8.42 | 3.41 | 9.473 | 15.7 |
| Yield | (g/g-cat) | 29 | 42 | 83 | 33 | 94 | 155 |
| Activity | (g/g-cat · hr) | 1.471 | 2.078 | 4.168 | 5.465 | 4.694 | 3.875 |
| conversion of EO | (%) | 63% | 30% | 32% | 13% | 49% | 53% |
| TOF | (mol/mol-cat · hr) | 3.26 | 4.61 | 9.25 | 12.13 | 10.42 | 8.60 |

Note)
TOF(turnover frequency): It represents the number of molecules reacted per unit active site per unit time, and is calculated using TON(turnover number), namely the number of molecule reacted per unit active site.

From the results of Table 1, it is confirmed that as the polymerization time passes, conversion rate increases. However, in case polymerization was conducted for 20 hours as in Experimental Examples 1a to 1c and 1e, compared to the PEC conversion rate of Experimental Example 1e wherein polymerization was conducted for 40 hours, there was little difference. Thus, it can be assumed that a polymerization reaction hardly progressed from 20 hours. It was also confirmed from the results of Table 1 that when the ZnGA catalyst and EDC were used, results suitable for a PEC solution polymerization was obtained.

In addition, the $^1$H NMR results of the PEC copolymers prepared in Experimental Examples 1d to 1f are respectively shown in FIGS. 1 to 3.

From the results of FIGS. 1 to 3, it was confirmed that as the polymerization time increases, the rate of conversion of ethyleneoxide into polycarbonate improves, while the rates

TABLE 2

|  |  | 2a<br>EO:MC =<br>1:0.56 | 2b<br>EO:MC =<br>1:1.05 | 2c<br>EO:MC =<br>1:0.94 |
|---|---|---|---|---|
| Cat. amt | (g) | 0.1 | 0.102 | 0.108 |
| EO | (g) | 7.54 | 8.07 | 9.25 |
| solvent (MC) | (g) | 4.25 | 8.51 | 8.70 |
| EO/cat. |  | 334 | 351 | 380 |
| $CO_2$ | (bar) | 23 | 22 | 22 |
| Temperature | (° C.) | 80 | 80 | 80 |
| Time | (h) | 20 | 20 | 20 |
| Yield | (g) | 7.680 | 7.800 | 7.680 |
| Yield | (g/g-cat) | 77 | 76 | 71 |
| Activity | (g/g-cat · hr) | 3.840 | 3.824 | 3.556 |
| Conversion rate of EO | (%) | 51% | 48% | 42% |
| TOF | (mol/mol-cat · hr) | 8.52 | 8.49 | 7.89 |
| Mol % (crude) | EC | 22.9 | 17.46 | 13.51 |
|  | PEC | 60.02 | 50.1 | 71.86 |

TABLE 2-continued

|  |  | 2a EO:MC = 1:0.56 | 2b EO:MC = 1:1.05 | 2c EO:MC = 1:0.94 |
|---|---|---|---|---|
|  | PEC-PEG | 9.52 | 9.35 | 8.80 |
|  | PEG | 7.56 | 23.09 | 5.83 |
| Mol % | EC | 0.45 | 0.61 | 1.08 |
| (precipitation) | PEC | 67.11 | 71.55 | 80.45 |
|  | PEC-PEG | 12.67 | 12.04 | 10.04 |
|  | PEG | 19.78 | 15.81 | 8.42 |

TABLE 3

|  |  |  | 2a | 2b | 2c |
|---|---|---|---|---|---|
| GPC* | Mn | (g/gmol) | 200802 | 195532 | 255308 |
|  | Mw | (g/gmol) | 427442 | 401608 | 480558 |
|  | PDI |  | 2.13 | 2.05 | 1.89 |
| GPC** | Mn | (g/gmol) | 171593 | 109202 | 142088 |
|  | Mw | (g/gmol) | 381633 | 290101 | 355375 |
|  | PDI |  | 2.22 | 2.66 | 2.5 |

*crude,
**precipitation

From the results of Table 2, it was confirmed that results suitable for solution polymerization are obtained even when MC is used. In addition, the conversion rate of EO was not significantly lowered compared to bulk polymerization, thus confirming that when the introduced amounts of the solvent and EO are similar, within the mole ratio of the catalyst used to EO of 1:300~1:400, the activity is not significantly affected.

In the case of Experimental Examples 2b and 2c, a more sufficient amount of solvent than Experimental Example 2a was introduced and thus side-reactions relatively decreased. In addition, although the conditions of Experimental Examples 2b and 2c are similar, the EC/PEC-PEG/PEG contents significantly differ. In this regard, it is judged that excess $CO_2$ concentration decreased due to the limitation in the continuous introduction of $CO_2$, and thus, alternating copolymerization required for the formation of a polymer was not properly achieved.

EXPERIMENTAL EXAMPLE 3

Solution polymerization was conducted with the composition of the following Table 4, by the same procedure as Experimental Example 2, while agitating with a mechanical agitator in a 2 L high pressure reactor. A copolymer of ethyleneoxide and carbon dioxide, polyethylenecarbonate, was prepared, wherein carbon dioxide was continuously supplied.

TABLE 4

|  |  | Experimental Example 3 |
|---|---|---|
| Cat. amt | (g) | 1.935 |
| EO | (g) | 182 |
| Solvent (MC) | (g) | 218 |
| EO/cat. |  | 417 |
| $CO_2$ (i) | (bar) | 30 |
| Temperature | (° C.) | 80 |
| Time | (h) | 20 |
| Yield | (g) | 25 |
| Yield | (g/g-cat) | 13 |
| Activity | (g/g-cat · hr) | 0.646 |

TABLE 4-continued

|  |  | Experimental Example 3 |
|---|---|---|
| Conversion rate of EO | (%) | 7% |
| TOF | (mol/mol-cat · hr) | 1.43 |
| Mol % | EC | 10.92 |
| (curde) | PEC | 68.12 |
|  | PEC-PEG | 9.49 |
|  | PEG | 11.47 |

TABLE 5

|  |  |  | Experimental Example 3 |
|---|---|---|---|
| GPC (crude) | Mn | (g/gmol) | 161668 |
|  | Mw | (g/gmol) | 368971 |
|  | PDI |  | 2.28 |

The small-scale reactor polymerization results of Experimental Examples 2b and 2c which use EO:MC at weight ratios of 1:1.05 and 1:0.94 were compared to the crude date of Table 5. As the result, it can be seen that if $CO_2$ is continuously introduced, the integral values of the NMR peaks of EC and PEG formed by side-reactions are remarkably lowered (inhibition of side-reactions). Thus, it is proved that when carbon dioxide is continuously introduced, the conditions for alternating with ethyleneoxide are improved, and thus, the formation of polyalkylenecarbonate polymer increases.

EXAMPLE 1

From the results of Experimental Examples 1 to 3, it was confirmed that when polymerization is progressed at high temperature for a long time, the amount of by-product polyethyleneglycol in the composition of the final product tends to increase. Thus, in order to improve this, solution polymerization was progressed at a ratio of the catalyst to ethyleneoxide of 1:224 for 6 hours, as shown in Table 6. In addition, a semi-batch type reactor into which $CO_2$ can be continuously introduced was used. And, the same ZnGA-AA catalyst as used in Experimental Example 1 was used.

TABLE 6

|  |  | Experimental Example 1 |
|---|---|---|
| Cat. amt | (g) | 0.2 |
| EO | (g) | 10.08 |
| Solvent (MC) | (g) | 8.57 |
| EO/cat. |  | 224 |
| $CO_2$ (i) | (bar) | 26 |
| $CO_2$ (m) | (bar) | 32 |
| $CO_2$ (f) | (bar) | 23 |
| $CO_2$ | (g) | 5.29 |
| Temperature | (° C.) | 80 |
| Time | (h) | 6 |
| Yield | (g) | 7.76 |
| Yield | (g/g-cat) | 39 |
| Activity | (g/g-cat · hr) | 6.467 |
| Conversion rate of EO | (%) | 39% |
| TOF | (mol/mol-cat · hr) | 14.35 |
| Mol % | EC | 6.99 |
| (crude) | PEC | 85.28 |

TABLE 6-continued

|  | Experimental Example 1 |
| --- | --- |
| PEC-PEG | 5.10 |
| PEG | 2.62 |

As shown in Table 6, in Example 1, the amount of catalyst to ethyleneoxide and the reaction time were appropriately combined, thus decreasing the production amount of polyalkyleneglycol while exhibiting conversion rate of ethyleneoxide of about 40%. Thus, it was confirmed that according to the present invention, high conversion rate and selectivity is obtained within a short time.

EXAMPLE 2

Polyethylenecarbonate was prepared with the composition of the following Table 7, while increasing catalyst equivalent to the weight of ethyleneoxide. Wherein, a semi-batch type reactor into which carbon dioxide can be continuously introduced was used.

TABLE 7

|  |  | Example 2 |
| --- | --- | --- |
| Cat. amt | (g) | 0.3 |
| EO | (g) | 9.81 |
| Solvent (MC) | (g) | 8.53 |
| EO/cat. |  | 145 |
| $CO_2$ (i) | (bar) | 20 |
| $CO_2$ (m) | (bar) | 24 |
| $CO_2$ (f) | (bar) | 13 |
| $CO_2$ | (g) | 3.89 |
| Temperature | (° C.) | 80 |
| Time | (h) | 6 |
| Yield | (g) | 11.91 |
| Yield | (g/g-cat) | 40 |
| Activity | (g/g-cat · hr) | 6.617 |
| Conversion rate of EO | (%) | 61% |
| TOF | (mol/mol-cat · hr) | 14.68 |
| Mol % (crude) | EC | 6.84 |
|  | PEC | 73.06 |
|  | PEC-PEG | 10.79 |
|  | PEG | 9.30 |

EXAMPLES 3 to 5

The results of solution polymerization of polyethylenecarbonate using a ZnGA-AA catalyst according to reaction time were compared. Wherein, a semi-batch type reactor into which carbon dioxide can be continuously introduced was used.

TABLE 8

|  |  | Example 3 | Example 4 | Example 5 |
| --- | --- | --- | --- | --- |
| Cat. amt | (g) | 0.4 | 0.4 | 0.4 |
| EO | (g) | 7.40 | 9.11 | 9.11 |
| Solvent (MC) | (g) | 8.53 | 8.52 | 8.52 |
| EO/cat. |  | 82 | 101 | 101 |
| $CO_2$ (i) | (bar) | 20 | 26 | 26 |
| $CO_2$ (m) | (bar) | 20 | 27 | 27 |
| $CO_2$ (f) | (bar) | 15 | 15 | 15 |
| $CO_2$ | (g) | 3.41 | 3.76 | 4.93 |
| Temperature | (° C.) | 80 | 80 | 80 |
| Time | (h) | 3 | 5 | 6 |
| Yield | (g) | 9.35 | 10.57 | 14.14 |
| Yield | (g/g-cat) | 23 | 26 | 35 |

TABLE 8-continued

|  |  | Example 3 | Example 4 | Example 5 |
| --- | --- | --- | --- | --- |
| Activity | (g/g-cat · hr) | 7.792 | 5.285 | 5.892 |
| Conversion rate of EO | (%) | 75% | 58% | 78% |
| TOF | (mol/mol-cat · hr) | 17.29 | 11.73 | 13.07 |
| Mol % (crude) | EC | 7.630 | 9.08 | 10.83 |
|  | PEC | 79.42 | 79.41 | 76.11 |
|  | PEC-PEG | 6.78 | 6.15 | 6.44 |
|  | PEG | 6.17 | 5.36 | 6.62 |

The result of Table 8 shows that if polymerization time is 6 hours or less, conversion rate of EO can be satisfied to some degree, the production amount of PEG is small, and EC is not additionally formed.

In addition, in Example 3 wherein the reaction time is 3 hours, conversion of EO improves to 75% at a temperature of 80° C., and high molecular weight polyethylenecarbonate having a PEC main chain with the content of impurities such as cyclic carbonate and polyethyleneglycol and the like of less than 20 mol % could be obtained.

EXAMPLES 6 to 7

Polyethylenecarbonate was prepared by solution polymerization using a ZnGA-AA catalyst, while changing the amount of solvent as shown in Table 9. Wherein, a semi-batch type reactor into which carbon dioxide can be continuously introduced was used.

TABLE 9

|  |  | Example 6 | Example 7 |
| --- | --- | --- | --- |
| Cat. amt | (g) | 0.200 | 0.200 |
| EO | (g) | 5.43 | 3.72 |
| Solvent (MC) | (g) | 4.26 | 8.52 |
| EO/cat. |  | 120 | 83 |
| $CO_2$ | (bar) | 30 | 29 |
| Temperature | (° C.) | 80 | 80 |
| Time | (h) | 3 | 3 |
| Yield | (g) | 4.330 | 5.590 |
| Yield | (g/g-cat) | 22 | 28 |
| Activity | (g/g-cat · hr) | 7.217 | 9.317 |
| Conversion rate of EO | (%) | 40% | 75% |
| TOF | (mol/mol-cat · hr) | 16.02 | 20.68 |
| Mol % (Crude) | EC | 7.24 | 5.57 |
|  | PEC | 81.18 | 89.65 |
|  | PEC-PEG | 4.89 | 3.09 |
|  | PEG | 6.69 | 1.69 |
| Mol % (Precipitation) | EC | 0.48 | 0.47 |
|  | PEC | 88.72 | 95.53 |
|  | PEC-PEG | 5.45 | 3.4 |
|  | PEG | 5.35 | 0.6 |

From the Table 9, it was confirmed that in Example 7, the amount of the solvent increased compared to Example 6, and thus, the conversion rate of EO was improved. In this regard, it is judged that a large quantity of $CO_2$ is dissolved due to the unique solubility of the solvent, and thus, the concentration of $CO_2$ in the reaction medium increases, and alternating copolymerization is better achieved during PEC polymerization. In addition, as clearly shown from the NMR analysis result of a crude sample, it is proved that the amount of PEG, which is the autopolymerization product of EO, remarkably decreases. Thus, it can be seen that if the introduction amount of a solvent is increased, the concentration of $CO_2$ in a reaction medium can be increased, and thus, the amount of PEG due to the autopolymerization of EO remarkably decreases.

COMPARATIVE EXAMPLES 1 to 2

Copolymers were prepared by the same procedure as Examples 6 and 7, except using hexane as a solvent. In addition, a semi-batch type reactor into which carbon dioxide can be continuously introduced was used.

TABLE 10

|  |  | Comparative Example 1 | Comparative Example 2 |
|---|---|---|---|
| Cat. amt | (g) | 0.200 | 0.200 |
| EO | (g) | 5.50 | 5.10 |
| Solvent(hexane) | (g) | 5.50 | 10.05 |
| EO/cat. |  | 120 | 111 |
| $CO_2$ | (bar) | 30 | 30 |
| Temperature | (° C.) | 80 | 80 |
| Time | (h) | 3 | 3 |
| Yield | (g) | 3.9 | 3.45 |
| Yield | (g/g-cat) | 19.5 | 17.25 |
| Activity | (g/g-cat · hr) | 6.50 | 5.75 |
| Conversion rate of EO | (%) | 35% | 34% |
| TOF | (mol/mol-cat · hr) | 14.42 | 12.78 |
| Mol % (Crude) | EC | 10.85 | 11.35 |
|  | PEC | 75.11 | 76.11 |
|  | PEC-PEG | 7.44 | 6.44 |
|  | PEG | 6.60 | 6.10 |

COMPARATIVE EXAMPLES 3 to 4

Copolymers were prepared by the same procedure as Examples 6 and 7, except using xylene as a solvent. In addition, a semi-batch type reactor into which carbon dioxide can be continuously introduced was used.

TABLE 11

|  |  | Comparative Example 3 | Comparative Example 4 |
|---|---|---|---|
| Cat. amt | (g) | 0.200 | 0.200 |
| EO | (g) | 5.40 | 4.9 |
| Solvent(xylene) | (g) | 5.10 | 10.20 |
| EO/cat. |  | 120 | 109 |
| $CO_2$ | (bar) | 30 | 30 |
| Temperature | (° C.) | 80 | 80 |
| Time | (h) | 3 | 3 |
| Yield | (g) | 4.12 | 3.5 |
| Yield | (g/g-cat) | 20.6 | 17.5 |
| Activity | (g/g-cat · hr) | 6.87 | 5.83 |
| Conversion rate of EO | (%) | 38% | 36% |
| TOF | (mol/mol-cat · hr) | 15.25 | 12.94 |
| Mol % (Crude) | EC | 11.35 | 9.36 |
|  | PEC | 73.11 | 75.10 |
|  | PEC-PEG | 6.44 | 7.45 |
|  | PEG | 9.10 | 8.09 |

COMPARATIVE EXAMPLE 5

It was attempted to prepare polyethylenecarbonate by the same procedure as Example 1 using acetonitrile as a solvent. However, under acetonitrile, a reaction was not progressed, and thus, polyethylenecarbonate could not be prepared. From the result, it was confirmed that the above solvent is not suitable for solution polymerization.

COMPARATIVE EXAMPLES 6 to 7

Bulk polymerization was progressed by a common method under the conditions of the following Table 12, to prepare PEC.

TABLE 12

|  |  | Comparative Example 6 | Comparative Example 7 |
|---|---|---|---|
| Cat. amt | (g) | 0.0501 | 0.1000 |
| EO | (g) | 5.66 | 10.57 |
| Solvent | (g) | 0.000 | 0.000 |
| EO/cat. |  | 501 | 469 |
| $CO_2$ (i) | (bar) | 25 | 25 |
| $CO_2$ (m) | (bar) | 42 | 45 |
| $CO_2$ (f) | (bar) | 6 | 25 |
| $CO_2$ | (g) | 4.08 | 5.50 |
| Temperature | (° C.) | 80 | 80 |
| Time | (h) | 20 | 20 |
| Yield | (g) | 4.250 | 10.560 |
| Yield | (g/g-cat) | 85 | 106 |
| Activity | (g/g-cat · hr) | 4.242 | 5.280 |
| Conversion rate of EO | (%) | 38% | 50% |
| TOF | (mol/mol-cat · hr) | 9.41 | 11.72 |

According to the result of Table 12, in case polyethylenecarbonate is prepared by the existing bulk polymerization, conversion rate was about 38 to 50%, but reaction time of 20 hours or more was taken, and as the polymerization was progressed, the catalyst in the reactor reacted with polymer to promote side-reactions.

Although specific parts of the invention have been described in detail, it would be obvious to one of ordinary knowledge in the art that such specific technologies are no more than preferable embodiments, and the scope of the invention is not limited thereto. Thus, substantial scope of the invention is defined by the appended claims and equivalents thereof.

The invention claimed is:

1. A method for preparing polyalkylenecarbonate comprising the step of:
   solution polymerizing an epoxide compound and continuously or non-continuously introduced carbon dioxide in the presence of a ZnGA-based catalyst and a solvent,
   wherein the solvent is C1-5 alkylene substituted with at least one chlorine,
   wherein the ZnGA-based catalyst includes a heterogeneous catalyst that includes zinc glutarate and acetic acid existing as separate mixtures (ZnGA-AA), and
   wherein the acetic acid is used in the amount of 1 to 10 parts by weight, based on 100 parts by weight of the ZnGA-based catalyst.

2. The method according to claim 1, wherein the epoxide compound: solvent is used at a weight ratio of 1:0.1 to 1:100.

3. The method according to claim 1, wherein the solvent is methylene chloride or ethylene chloride.

4. The method according to claim 1, wherein the ZnGA-based catalyst includes a heterogeneous catalyst including zinc glutarate prepared by the reaction of zinc oxide and glutaric acid.

5. The method according to claim 1, wherein the ZnGA-based catalyst: epoxide compound is introduced at a mole ratio of 1:50 to 1:1000.

6. The method according to claim 1, wherein the epoxide compound: carbon dioxide is introduced at a mole ratio of 1:1 to 1:10.

7. The method according to claim 1, wherein the solution polymerization is conducted at 60 to 90° C. and 20 to 40 bar, for 3 to 9 hours.

8. The method according to claim 1, wherein the epoxide compound is at least one selected from the group consisting of C2-20 alkylene oxide unsubstituted or substituted with halogen or a C1-5alkyl group; C4-20 cycloalkylene oxide unsubstituted or substituted with halogen or a C1-5 alkyl group; and C8-20 styrene oxide unsubstituted or substituted with halogen or a C1-5 alkyl group.

9. The method according to claim 1, wherein the epoxide compound includes C2-20 alkylene oxide unsubstituted or substituted with halogen or a C1-5 alkyl group.

10. The method according to claim 1, wherein the polyalkylene carbonate includes polyethylenecarbonate with weight average molecular weight of 5000 to 500,000.

\* \* \* \* \*